United States Patent Office 3,584,009
Patented June 8, 1971

3,584,009
2H-4,9-ETHANOBENZISOINDOLONES AND DERIVATIVES THEREOF AS PHARMACEUTICAL AGENTS
Walter A. Gregory, Wilmington, Del., assignor to E. I. du Pont de Nemours and Company, Wilmington, Del.
No Drawing. Filed Sept. 26, 1968, Ser. No. 763,029
Int. Cl. C07d 27/48
U.S. Cl. 260—326.1                                         8 Claims

ABSTRACT OF THE DISCLOSURE

This invention relates to novel 2H-4,9-ethanobenzisoindolones, related compounds, salts thereof and methods of preparing said compounds. This invention further relates to a method for using the compounds of the invention as analgesic agents.

BACKGROUND OF THE INVENTION

This invention relates to novel 2H-4,9-ethanobenzisoindolones and derivatives thereof. The compounds of this invention are useful as pharmaceutical agents. More particularly, the compounds of this invention are useful for relieving pain in warm-blooded animals. Preferably, the compounds of this invention are used as analgesics to relieve pain in mammals.

SUMMARY OF THE INVENTION

In summary, this invention relates to novel 2H-4,9-ethanobenzisoindolones and derivatives thereof represented by the following formulae:

(1)

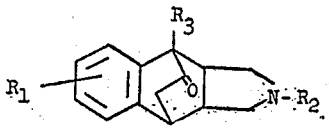

where:

$R_1$ is hydrogen, $NO_2$, $OR_4$, or

where $R_4$ is hydrogen, alkyl of one through three carbons or

where $R_5$ is hydrogen or alkyl of one through three carbons, and $R_9$ is alkyl of one through six carbons;

$R_2$ is hydrogen alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons, benzyl or phenethyl; and the pharmaceutically acceptable salts of said compounds.

(2)

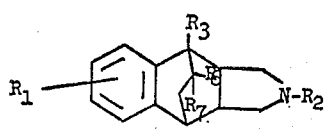

where:

$R_1$ is hydrogen, $NO_2$, $OR_4$, or

where $R_4$ is hydrogen, alkyl of one through three carbons or

where $R_5$ is hydrogen or alkyl of one through three carbons, and $R_9$ is alkyl of one through six carbons;

$R_2$ is hydrogen, alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons, benzyl or phenethyl;

$R_6$ is hydrogen or $OR_8$
 where $R_8$ is hydrogen or alkyl of one through three carbons;

$R_7$ is hydrogen or alkoxy of one through three carbons with the limitation that when $R_6$ is hydroxy, $R_7$ is hydrogen; or $R_7$ and $R_8$ taken together with the oxygens form cyclic alkyl ketal rings are alkylene of two or three carbons; and the pharmaceutically acceptable salts of said compounds.

This invention also relates to pharmaceutical compositions comprising a compound of Formula 1 or a compound of Formula 2 and a suitable pharmaceutical carrier.

This invention further relates to a method of effecting analgesia in a warm-blooded animal which comprises administering an analgetic effective amount of a compound of Formula 1 or Formula 2.

DETAILED DESCRIPTION OF THE INVENTION

This invention is founded on the discovery that 2H-4,9-ethanobenzisoindolones and the derivatives thereof, depicted at Formula 1 and Formula 2 above, are useful as analgetic agents. The compounds of this invention, when administered to an animal suffering pain, are effective in alleviating the discomfort, distress or agony associated with the pain.

Illustrative of the compounds of this invention are the following:

1,3,3a,4,9,9a-hexahydro-4,9-ethano-2H-benz[f]isoindol-10-one
1,3,3a,4,9,9a-hexahydro-2-methyl-4,9-ethano-2H-benz[f]isoindol-10-one
1,3,3a,4,9,9a-hexahydro-2-allyl-4,9-ethano-2H-benz[f]isoindol-10-one
1,3,3a,4,9,9a-hexahydro-2-(3,3-dimethylallyl)-4,9-ethano-2H-benz[f]isoindol-10-one
1,3,3a,4,9,9a-hexahydro-2-cyclopropylmethyl-4,9-ethano-2H-benz[f]isoindol-10-one
1,3,3a,4,9,9a-hexahydro-2-propargyl-4,9-ethano-2H-benz[f]isoindol-10-one
1,3,3a,4,9,9a-hexahydro-2-benzyl-4,9-ethano-2H-benz[f]isoindol-10-one
1,3,3a,4,9,9a-hexahydro-2-phenethyl-4,9-ethano-2H-benz[f]isoindol-10-one
1,3,3a,4,9,9a-hexahydro-2,9-dimethyl-4,9-ethano-2H-benz[f]isoindol-10-one
1,3,3a,4,9,9a-hexahydro-9-benzyl-2-methyl-4,9-ethano-2H-benz[f]isoindol-10-one
6-acetyl-1,3,3a,4,9,9a-hexahydro-2-methyl-4,9-ethano-2H-benz[f]isoindol-10-one
6-acetyl-1,3,3a,4,9,9a-hexahydro-2-phenethyl-4,9-ethano-2H-benz[f]isoindol-10-one
1,3,3a,4,9,9a-hexahydro-5-hydroxy-2-methyl-4,9-ethano-2H-benz[f]isoindol-10-one
1,3,3a,4,9,9a-hexahydro-2-methyl-5-phenethyl-4,9-ethano-2H-benz[f]isoindol-10-one 1,3,3a,4,9,9a-hexahydro-2-methyl-5-methoxy-4,9-
   ethano-2H-benz[f]isoindol-10-one
1,3,3a,4,9,9a-hexahydro-6-hydroxy-2-methyl-4,9-
   ethano-2H-benz[f]isoindol-10-one
1,3,3a,4,9,9a-hexahydro-6-hydroxy-2-phenethyl-4,9-
   ethano-2H-benz[f]isoindol-10-one
1,3,3a,4,9,9a-hexahydro-6-methoxy-2-methyl-4,9-
   ethano-2H-benz[f]isoindol-10-one
1,3,3a,4,9,9a-hexahydro-2,9-dimethyl-6-hydroxy-4,9-
   ethano-2H-benz[f]isoindol-10-one
1,3,3a,4,9,9a-hexahydro-6-methoxy-9-methyl-2-phen-
   ethyl-4,9-ethano-2H-benz[f]isoindol-10-one The pharmaceutically acceptable salts of the above compounds are of course also included within the scope of this invention.

It will be understood that the term "pharmaceutically acceptable salts" as used herein is intended to include the salts of the compounds of this invention with a non-toxic anion. Representative of such salts are hydrochlorides, hydrobromides, sulfates, phosphates, nitrates, acetates, succinates, adipates, propionates, tartrates, maleates, citrates, bicarbonates, pamoates, cyclohexylsulfamates and acetylsalicylates. Of these, the hydrochlorides are preferred.

Of the compounds of this invention, the following are preferred due to their high level of analgetic activity.

1,3,3a,4,9,9a-hexahydro-2-methyl-4,9-ethano-2H-benz[f]
   isoindol-10-one
1,3,3a,4,9,9a-hexahydro-2-(3,3-dimethylallyl)-4,9-ethano-
   2H-benz[f]isoindol-10-one
1,3,3a,4,9,9a-hexahydro-2-phenethyl-4,9-ethano-2H-
   benz[f]isoindol-10-one
1,3,3a,4,9,9a-hexahydro-2-methyl-6-hydroxy-4,9-ethano-
   2H-benz[f]isoindol-10-one
1,3,3a,4,9,9a-hexahydro-6-methoxy-2-methyl-4,9-ethano-
   2H-benz[f]isoindol-10-one

PREPARATION

The compounds of this invention are prepared by treating a suitable 1,2,3,4-tetrahydro-9-oxo-1,4-ethanonaphthalene-2,3-dicarboxylic anhydride with ammonia or an appropriate amine reactant to obtain a corresponding 1,2,3,4-tetrahydro-9-oxo-1,4-ethanonaphthalene-2,3-dicarboximide.

The ketone at position 9 is converted to its dimethoxy derivative for protection and the remaining carbonyl groups in the imide ring are reduced with a suitable agent such as lithium aluminum hydride. Alternatively a cyclic acetal can be formed at position 9 prior to reduction of the carbonyl groups in the imide ring. The dimethoxy or cyclic acetal compound is then acidified followed by basification to give the desired 1,3,3a,4,9,9a-hexahydro-4,9-ethano-2H-benz[f]isoindol-10-one of this invention.

The art is familiar with the preparation of various 1,2,3,4-tetrahydro-9-oxo-1,4-ethanonaphthalene-2,3-dicarboxylic anhydrides suitable for use as starting materials for this invention. For example, Takeda and Kitahonoki, J. Pharm. Soc. Jap., 73, 280 (1953) teach a preparation of 1,2,3,4-tetrahydro-9-oxo-1,4-ethanonaphthalene-2,3-exo-dicarboxylic anhydride.

Other anhydride starting materials can be prepared by dehydrating an appropriate 1,4-ethanonaphthalene-2,3-dicarboxylate. Preparation of suitable dicarboxylate starting materials is known to the art. For example, Plieninger, Lehnert and Mangold, Chem. Ber., 100 2421 (1967) teach the preparation of 1,2,3,4-tetrahydro-5-nitro-9-oxo-1,4-ethanonaphthalene-2,3-exo-dicarboxylate. Robinson and Rydan, J.C.S., 1394 (1939) teach the preparation of 2-methoxy-6-acetylnaphthalene; and Kornblum, Seltzer and Haberfield, J.A.C.S., 85 1148 (1963) teach the preparation of 1-benzyl-2-naphthol which materials can be converted to a dicarboxylic acid anhydride by treating the naphthalene with maleic anhydride and ethyl acetate.

It will be understood that the compounds of this invention can exist in a number of isomeric forms.

For example, it is apparent from Formulas 1 and 2 above that carboximide ring can be either endo or exo in relation to the keton bridge. The exo isomers of the compounds of this invention are represented by the following formulae:

(3)

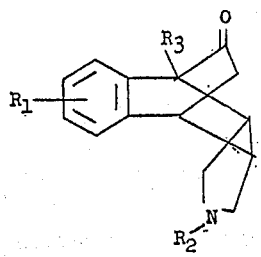

where $R_1$, $R_2$ and $R_3$ are defined as above; and (4)

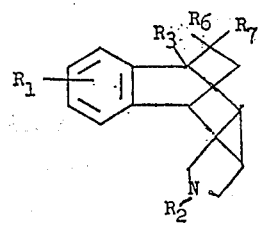

where $R_1$, $R_2$, $R_3$, $R_6$ and $R_7$ are defined as above.

The endo isomers of the compounds of this invention are represented by the following formulae:

(5)

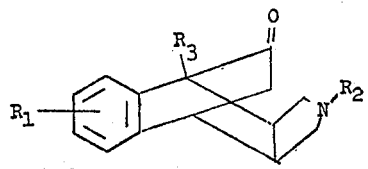

where $R_1$, $R_2$ and $R_3$ are defined as above; and (6)

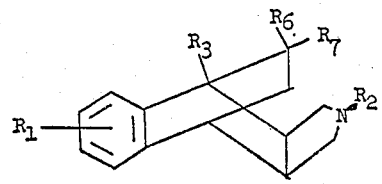

where $R_1$, $R_2$, $R_3$, $R_6$ and $R_7$ are defined as above.

In addition, the compounds of this invention exist in two forms which are non-superimposable mirror images of each other. It will therefore be understood that the d- and l-optical isomers of both the endo and exo compounds of this invention are included within the scope of this invention.

The following examples are presented to further illustrate the preparation of the compounds of this invention.

EXAMPLE 1

1,3,3a,4,9,9a-hexahydro-2-methyl-4,9-ethano-2H-benz[f]-
isoindol-10-one

Dry methylamine gas is bubbled for one hour into a stirred suspension of one mole of 1,2,3,4-tetrahydro-9-oxo-1,4-ethanonaphthalene-2,3-exo-dicarboxylic anhydride in 1200 ml. of diglyme (diethylethoxymethylenemalonate). The mixture is refluxed for two hours and the solvent is distilled off until the vapour temperature reaches 160° C. The clear solution is cooled and then poured on a mixture of 2 kg. ice and 3 liters water to give a solid product which is collected by filtration. Recrystallization from ethanol gives N-methyl - 1,2,3,4 - tetrahydro-9-oxo-1,4-ethanonaphthalene-2,3-exo-dicarboximide, M.P. 198–199° C.

A stirred mixture of 0.2 mole of the dicarboximide in a solution containing 180 ml. of methanol, 90.0 gm. of dimethyl sulfite and 1.0 ml. of methanesulfonic acid is slowly heated to reflux. After a vigorous evolution of sulfur dioxide takes place, the clear solution is refluxed for 16 hours. The reaction mixture is then cooled to 20° C. and maintained at this temperature while a suspension of 1.0 gm. of sodium methoxide in 10.0 ml. of methanol is added, followed by 200 ml. of cold 40% sodium hydroxide solution. The product which separates is taken up in dichloromethane. The dichloromethane extract is washed twice with an equal volume of water and dried over magnesium sulfate. The residue obtained after removal of the solvent is recrystallized from ethanol to give N-methyl-1,2,3,4 - tetrahydro-9,9-dimethoxy-1,4-ethanonaphthalene-2,3-exo-dicarboximide, M.P. 153–154° C.

A solution of 0.2 mole of the dimethyl ketal in 400 ml. of tetrahydrofuran is added slowly to a stirred suspension of 17.0 gm. of lithium aluminum hydride in 400 ml. of tetrahydrofuran. The reaction mixture is stirred and refluxed for 6 hours in an atmosphere of nitrogen and then cooled. The excess lithium aluminum hydride is decomposed by the careful addition of 40 ml. of water followed by 40 ml. of 10% sodium hydroxide solution. The mixture is filtered and the solids washed well four times with 100 ml. of warm tetrahydrofuran for each wash. The filtrate and washings are combined and concentrated in vacuo to a syrup. The syrup is stirred overnight at room temperature with a solution of 200 ml. of concentrated hydrochloric acid and 200 ml of water. The clear acid solution is made strongly alkaline by the addition of excess 40% sodium hydroxide solution. The temperature of the reaction mixture is kept between 10–15° C. during the addition.

The precipitated solid is taken up in ether and the ether layer is separated and dried over magnesium sulfate. The residue obtained after removal of the solvent in vacuo is recrystallized from ether to give 1,3,3a,4,9,9a-hexahydro - 2 - methyl-4,9-ethano-2H-benz[f]isoindol-10-one, M.P. 100–102° C.

EXAMPLE 2

1,3,3a,4,9,9a-hexahydro-2-cyclopropylmethyl-4,9-ethano-2H-benz[f]isoindol-10-one By substituting cyclopropylmethylamine for the methylamine employed in Example 1, the corresponding N-cyclopropylmethyl - 1,2,3,4 - tetrahydro-9-oxo-1,4-ethanonaphthalene-2,3-exo-dicardboximide, M.P. 122–123° C. is obtained. Treatment of this dicarboximide with dimethyl sulfite in methanol gives N-cyclopropylmethyl-1,2,3,4-tetrahydro - 9,9 - dimethoxy-1,4-ethanonaphthalene-2,3-exo-dicarboximide M.P. 110–112° C. Reduction of this ketal with lithium aluminum hydride followed by hydrolysis and work up as described in Example 1 gives 1,3,3a,4,9,9a - hexahydro-2-cyclopropylmethyl-4,9-ethano-2H-benz[f]isoindol-10-one, M.P. 65–66° C.

EXAMPLES 3–5

The procedure of Example 2 is repeated, substituting the indicated "Amine" for the cyclopropylmethylamine of Example 2 to obtain the indicated "Product."

| Ex. | Amine | Product |
| --- | --- | --- |
| 3 | Ammonia | 1,3,3a,4,9,9a-hexahydro-4,9-ethano-2H-benz[f]isoindol-10-one. |
| 4 | Benzylamine | 1,3,3a,4,9,9a-hexahydro-2-benzyl-4,9-ethano-2H-benz[f]isoindol-10-one. |

EXAMPLE 5

1,3,3a,4,9,9a-hexahydro-2-phenethyl-4,9-ethano-2H-benz[f]isoindol-10-one hydrochloride By substituting phenethylamine for the methylamine employed in Example 1, the corresponding N-phenethyl-1,2,3,4 - tetrahydro - 9 - oxo-1,4-ethanonaphthalene-2,3-exo-dicarboximide, M.P. 165–166° C. is obtained. Treatment of this dicarboximide with dimethyl sulfite in methanol gives N - phenethyl - 1,2,3,4-tetrahydro-9,9-dimethoxy - 1,4 - ethanonaphthalene-2,3-exo-dicarboximide M.P. 140–142° C. Reduction of this ketal with lithium aluminum hydride followed by hydrolysis and work up as described in Example 1 gives an oil. The oil is dissolved in ether. The ether solution is saturated with dry hydrogen chloride gas to produce a precipitate which is collected by filtration. Recrystallization from ethanol/ether gives 1,3,3a,4,9,9a - hexahydro - 2 - phenethyl-4,9-ethano-2H-benz[f]isoindol-10-one hydrochloride, M.P. 252–253° C.

EXAMPLE 6

1,3,3a,4,9,9a-hexahydro-2-allyl-4,9-ethano-2H-benz[f]isoindol-10-one hydrochloride By substituting allylamine for the phenethylamine employed in Example 5, the corresponding N-allyl-1,2,3,4-tetrahydro - 9 - oxo-1,4-ethanonaphthalene-2,3-exo-dicarboximide, M.P. 115–116° C. is obtained. Treatment of this dicarboximide with dimethyl sulfite in methanol gives N - allyl - 1,2,3,4 - tetrahydro-9,9-dimethoxy-1,4-ethanonaphthalene-2,3-exo-dicarboximide, M.P. 109–110° C. Reduction of this ketal with lithium aluminum hydride followed by hydrolysis and work up as described in Exampie 6 gives 1,3,3a,4,9,9a-hexahydro-2-allyl-4,9-ethano-2H-benz[f]isoindol-10-one hydrochloride, M.P. 212–214° C.

EXAMPLE 7

1,3,3a,4,9,9a-hexahydro-2-methyl-5-hydroxy-4,9-ethano-2H-benz[f]isoindol-10-one

Enough glacial acetic acid is added to a boiling suspension of 0.1 mole of dimethyl-1,2,3,4-tetrahydro-5-nitro-9 - oxo - 1,4-ethanonaphthalene-2,3-exo-dicarboxylate in 400 ml. of concentrated hydrochloric acid to produce a clear solution. The reaction is then refluxed for 4 hours with the addition of 100 ml. of concentrated hydrochloric acid after 2 hours. Concentration of the hydrolysis solution gives 1,2,3,4 - tetrahydro-5-nitro-9-oxo-1,4-ethanonaphthalene-2,3-exo-dicarboxylic acid. This acid is refluxed with 200 ml. of acetic anhydride for 2 hours and the solution is then concentrated to give a residue of 1,2,3,4-tetrahydro - 5 - nitro - 9 - oxo-1,4-ethanonaphthalene-2,3-exo-dicarboxylic anhydride.

Treatment of the anhydride with methylamine as described in Example 1 furnishes N-methyl-1,2,3,4-tetrahydro - 5 - nitro - 9-oxo-1,4-ethanonaphthalene-2,3-exo-dicarboximide.

A solution of 0.1 mole of the dicarboximide in 500 ml. of ethanol is shaken with 5 gm. of 5% palladium on charcoal in a hydrogen atmosphere until hydrogen absorption ceases. Removal of the catalyst by filtration, and concentration of the filtrate in vacuo yields a residue of N - methyl - 1,2,3,4-tetrahydro-5-amino-9-oxo-1,4-ethanonaphthalene-2,3-exo-dicarboximide.

A solution of 0.1 mole of this dicarboximide in 200 ml. of tetrahydrofuran is added slowly to a stirred suspension of 11.0 gm. of lithium aluminum hydride in 200 ml. of tetrahydrofuran. The reaction mixture is stirred and refluxed for 6 hours in an atmosphere of nitrogen and then cooled and the excess lithium aluminum hydride decomposed by the careful addition of 26 ml. of water followed by 26 ml. of 10% sodium hydroxide solution. The mixture is filtered and the solids washed well with 4× 50 ml. of warm tetrahydrofuran. The filtrate and washings are combined and concentrated in vacuo to a syrup which is dissolved in 500 ml. of 10% hydrochloric acid. The acid solution is washed twice with 100 ml. of dichloromethane and made basic with excess 20% sodium hydroxide solution.

The organic material which separates is extracted into dichloromethane and dried over magnesium sulfate. Removal of the solvent in vacuo gives a residue of 1,3,3a,4,9,9a - hexahydro - 2-methyl-5-amino-4,9-ethano-2H-benz[f]isoindol-10-ol.

A solution of 30.5 gm. of the above benz[f]isoindol-10-ol in 100 gm. of concentrated sulfuric acid and 75 ml. of water is stirred while 100 gm. of ice is added. The mixture is then cooled to 0–5° C. by immersion in a freezing mixture, and a solution of 18.0 gm. of sodium nitrite in 40 ml. of water is added over a period of 10 min. until a permanent color is given to potassium iodide-starch paper.

After stirring for a further 10 min. the solution of the diazonium salt is run into a boiling solution of 150 ml. of concentrated sulfuric acid and 150 ml. of water. When all the diazonium solution has been introduced, the mixture is boiled for a further 5 minutes and then poured into one liter of ice water. The resulting solution is neutralized with concentrated sodium bicarbonate solution and extracted with dichloromethane. The organic extract is dried over magnesium sulfate and concentrated in vacuo to give a residue of 1,3,3a,4,9,9a-hexahydro-2-methyl-5,10-dihydroxy-4,9-ethano-2H-benz[f]isoindol.

A solution of 10 gm. of the above dihydroxy compound in 90 ml. of pyridine is combined with 9.3 gm. of chromium trioxide in 90 ml. of pyridine. The reaction mixture is allowed to stir overnight and is then poured into 500 ml. of water. Extraction with 3× 200 ml. portions of dichloromethane followed by drying over magnesium sulfate furnishes an extract which on concentrating in vacuo leaves a residue of 1,3,3a,4,9,9a-hexahydro-2-methyl-5-hydroxy-4,9-ethano - 2H - benz[f]isoindol-10-one.

EXAMPLE 8

1,3,3a,4,9,9a-hexahydro-2-methyl-5-methoxy-4,9-ethano-2H-benz[f]isoindol-10-one

A solution of 10.0 gm. of 1,3,3a,4,9,9a-hexahydro-2-methyl-5-hydroxy-4,9-ethano - 2H - benz[f]isoindol-10-one in 30 ml. of 10% sodium hydroxide solution is treated at room temperature with 6.0 gm. of dimethyl sulfate. The reaction mixture is warmed for one hour at 70–80° C. and then allowed to cool.

Extraction of the mixture with dichloromethane gives, after drying over magnesium sulfate and concentrating, a residue of 1,3,3a,4,9,9a-hexahydro-2-methyl-5-methoxy-4,9-ethano-2H-benz[f]isoindol-10-one.

EXAMPLE 9

1,3,3a,4,9,9a-hexahydro-2-methyl-4,9-ethano-2H-benz[f]isoindole

A stirred mixture of 9.0 gm. of 1,3,3a,4,9,9a-hexahydro-2-methyl-4,9-ethano-2H-benz[f]isoindol-10-one, 7.0 gm. of finely powdered potassium hydroxide and 5.0 ml. of 95% hydrazine hydrate in 50.0 ml. of diethylene glycol is refluxed for 2 hours. The solvent is then distilled off until the vapour temperature reaches 195° C. The reaction mixture is then refluxed for a further 4 hours. The cooled solution is poured into 250 ml. of water and the oil which separates is extracted with ether. The ether extract is washed four times with 50 ml. portions of water and dried over magnesium sulfate. The ether solution is saturated with dry hydrogen chloride gas to give a precipitate which is collected by filtration. Recrystallization from ethanol/ether gives 1,3,3a,4,9,9a-hexahydro-2-methyl-4,9-ethano - 2H - benz[f]isoindole hydrochloride, M.P. 275–277° C.

EXAMPLE 10

1,3,3a,4,9,9a-hexahydro-2-methyl-6-acetyl-4,9-ethano-2H-benz[f]isoindol-10-one

A solution of 0.2 mole of 2-methoxy-6-acetylnaphthalene in 200 ml. of 47% aqueous hydrobromic acid and 100 ml. of glacial acetic acid is refluxed for 3 hours. The reaction mixture is concentrated to give a residue which is taken up in 20% sodium hydroxide solution and filtered. The filtrate is made acid with 20% sulfuric acid and extracted with ether.

The ether extract is dried over magnesium sulfate and concentrated to give a residue of 6-acetyl-2-naphthol.

A stirred mixture of 0.1 mole of 6-acetyl-2-naphthol and 0.1 mole of maleic anhydride is heated at 220–230° C. for 40 minutes. After cooling to 100° C., about 100 ml. of ethyl acetate is run in and the mixture stirred at room temperature. Fractional crystallization of the solid product yields 1,2,3,4-tetrahydro - 6 - acetyl-9-oxo-1,4-ethanonaphthalene-2,3-exo-dicarboxylic anhydride.

Treatment of this anhydride with methylamine as described in Example 1 gives N-methyl-1,2,3,4-tetrahydro-6-acetyl-9-oxo-1,4-ethanonaphthalene - 2,3 - exo-dicarboximide. Treatment of this dicarboximide with dimethyl sulfite in methanol gives N-methyl-1,2,3,4-tetrahydro-6-(1,1-dimethoxyethyl)-9,9-dimethoxy - 1,4 - ethanonaphthalene-2,3-exo-dicarboximide. Reduction of this diketal with lithium aluminum hydride followed by hydrolysis and work up as described in Example 1 furnishes 1,3,3a, 4,9,9a-hexahydro-2-methyl-6-acetyl - 4,9 - ethano-2H-benz[f]isoindol-10-one.

EXAMPLE 11

1,3,3a,4,9,9a-hexahydro-2-methyl-4,9-ethano-2H-benz[f]isoindol-10-ol

A solution of 0.2 mole of N-methyl-1,2,3,4-tetrahydro-9-oxo-1,4-ethanonaphthalene - 2,3 - exo-dicarboximide in 500 ml. of tetrahydrofuran is added slowly to a stirred suspension of 22.0 gm. of lithium aluminum hydride in 500 ml. of tetrahydrofuran. The reaction mixture is stirred and refluxed for 6 hours in an atmosphere of nitrogen, is then cooled and the excess lithium aluminum hydride is then decomposed by the careful addition of 50 ml. of water followed by 50 ml. of 10% sodium hydroxide solution. The mixture is filtered and the solids washed well with 4× 100 ml. of warm tetrahydrofuran. The filtrate and washings are combined and concentrated in vacuo to give a residue of 1,3,3a,4,9,9a-hexahydro-2-methyl-4,9-ethano-2H-benz[f]isoindol-10-ol.

EXAMPLE 12

1,3,3a,4,9,9a-hexahydro-2-methyl-9-benzyl-4,9-ethano-2H-benz[f]isoindol-10-one

A stirred mixture of 0.5 mole of 1-benzyl-2-naphthol and 0.5 mole of maleic anhydride is heated at 220–230° C. for 40 minutes. After cooling to 100° C., about 50 ml. of ethyl acetate is run in and the mixture stirred at room temperature. Fractional crystallization of the solid product yields 1,2,3,4-tetrahydro - 1 - benzyl-9-oxo-1,4-ethanonaphthalene-2,3-oxo-dicarboxylic anhydride.

Treatment of this anhydride with methylamine as described in Example 1 gives N-methyl-1,2,3,4-tetrahydro-1-benzyl-9-oxo - 1,4 - ethanonaphthalene - 2,3 - exo-dicarboximide. Reaction of this dicarboximide with dimethyl sulfite in methanol gives N-methyl-1,2,3,4-tetrahydro-1-benzyl-9,9-dimethoxy - 1,4 - ethanonaphthalene-2,3-exo-dicarboximide. Reduction of this ketal with lithium aluminum hydride followed by hydrolysis and work up as described in Example 1 furnishes 1,3,3a,4,9,9a-hexahydro-2-methyl-9-benzyl - 4,9 - ethano-2H-benz[f]isoindol-10-one.

EXAMPLE 13

1,3,3a,4,9,9a-hexahydro-10-methoxy-2-methyl-4,9-ethano-2H-benz[f]isoindole

A solution of 4.6 gm. of sodium borohydride in 20 ml. of water is added to a stirred solution of 0.1 mole of N-methyl-1,2,3,4-tetrahydro-9-oxo - 1,4 - ethanonaphthalene-2,3-exo-dicarboximide in 400 ml. methanol. The reaction mixture is stirred at room temperature for 12 hours and is then concentrated to a volume of about 150 ml. and diluted with 100 ml. of water. The solid precipitate is taken up in dichloromethane and the organic layer is separated, washed twice with 50 ml. water and dried over magnesium sulfate. Removal of the solvent in vacuo gives a residue of N-methyl-1,2,3,4-tetrahydro-9-hydroxy - 1,4 - ethanonaphthalene-2,3-exo-dicarboximide.

A solution of 0.1 mole of the alcohol in 150 ml. of dimethyl formamide is added slowly to a stirred suspension of 2.5 gm. of sodium hydride in 100 ml. of dimethyl formamide. After the theoretical volume of hydrogen has been evolved, a solution of 14.5 gm. of methyl iodide in 50 ml. of dimethyl formamide is added to the reaction mixture. The mixture is stirred and refluxed for 6 hours and is then cooled and poured into 500 ml. of water. The organic material which separates is extracted into dichloromethane and the organic layer is separated, washed twice with 100 ml. of water and dried over magnesium sulfate. Removal of the solvent in vacuo gives a residue of N-methyl - 1,2,3,4 - tetrahydro-9-methoxy-1,4-ethanonaphthalene-2,3-exo-dicarboximide.

Reduction of this methyl ether with lithium aluminum hydride followed by hydrolysis and work up as described in Example 11 gives 1,3,3a,4,9,9a-hexahydro-10-methoxy-2-methyl-4,9-ethano-2H-benz[f]isoindole.

EXAMPLE 14

1,3,3a,4,9,9a-hexahydro-2-methyl-4,9-ethano-2H-benz[f]isoindol-10-one endo

By substituting 1,2,3,4-tetrahydro - 9 - oxo-1,4-ethanonaphthalene-2,3-endo-dicarboxylic anhydride [Cookson and Wariyar, J. Chem. Soc. 2302 (1956)] for the exo-anhydride employed in Example 1, the corresponding N-methyl - 1,2,3,4 - tetrahydro-9-oxo-1,4-ethanonaphthalene-2,3-endo-dicarboximide is obtained. Treatment of this dicarboximide with dimethyl sulfite in methanol gives N-methyl-1,2,3,4-tetrahydro - 9,9 - dimethoxy-1,4-ethanonaphthalene-2,3-endo-dicarboximide.

Reduction of this ketal with lithium aluminum hydride followed by hydrolysis and work up as described in Example 1 gives 1,3,3a,4,9,9a-hexahydro - 2 - methyl-4,9-ethano-2H-benz[f]isoindol-10-one endo.

EXAMPLE 15

1,3,3a,4,9,9a-hexahydro-2-methyl-4,9-ethano-2H-benz[f]isoindol-10-one

A stirred mixture of 0.1 mole of N-methyl-1,2,3,4-tetrahydro-9-oxo-1,4-ethanonaphthalene - 2,3 - exo-dicarboximide, 6.2 gm. of ethylene glycol and 0.5 gm. of p-toluenesulfonic acid in 300 ml. of benzene is refluxed for 6 hours. By the end of this time, the theoretical amount of water is collected in a Dean-Stark trap.

The reaction mixture is concentrated in vacuo to give a solid residue which is recrystallized from ethanol yielding N-methyl - 1,2,3,4 - tetrahydro - 9,9 - ethylenedioxy-1,4-ethanonaphthalene-2,3-exo-dicarboximide, M.P. 197–199° C.

Reduction of this ketal with lithium aluminum hydride followed by hydrolysis and work up as described in Example 1 gives 1,3,3a,4,9,9a-hexahydro-2-methyl-4,9-ethano-2H-benz[f]isoindol-10-one, M.P. 100–102° C.

The preceding examples can be repeated substituting equivalent amounts of appropriate starting materials to obtain other compounds of this invention including those listed hereinbefore.

The compounds of this invention can be administered to warm-blooded animals for analgesic effect according to this invention by any suitable means. For example, administration can be parenteral, that is, subcutaneous, intramuscular, or intraperitoneal. Alternatively or concurrently, administration can be by the oral route.

Of the above, the oral route of administration is preferred because of its convenience and aesthetic appeal to the patient and also because the compounds of this invention have the advantage of being well absorbed after oral administration. It has been determined, using standard laboratory tests such as the Rat Tail Flick Test described later, that the compounds of this invention are almost as effective after oral administration as after parenteral administration.

The high level of oral effectiveness for the compounds of this invention is a distinct advantage over presently available analgetic agents of the same potency range. The presently available, highly-potent, analgetics are, in general, relatively poorly absorbed and require the administration of considerably larger quantities by the oral route as compared with the quantity administered by the parenteral route to obtain equivalent analgetic activity.

The dosage of compounds of this invention administered to the warm-blooded animal will depend on the age, health and weight of the said warm-blooded animal recipient, the frequency of administration and the intensity of pain to be alleviated. Generally, a daily dosage of active ingredient compound will be from about 0.03 mg. to 0.14 g. per kg. of body weight, although lower, such as 0.01 mg. per kg., or higher amounts can be used. Ordinarily, from 1.4 to 2.8 mg. per kg. of body weight per day, in single or divided doses and preferably in divided doses, is effective to obtain the desired analgetic response.

Formulations of the compounds of this invention for administration to subjects suffering from pain will contain besides the active ingredient of this invention, a solid or liquid non-toxic pharmaceutical carrier for the active ingredient.

One embodiment of a pharmaceutical composition of this invention is a gelatin capsule for oral administration containing from about 1–50% of a compound of this invention and 99–50% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 1% to 50% by weight of active ingredient. These dosage forms contain from about 1 to 500 mg. of active ingredient, with from about 1 to about 100 mg. most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like.

In general, water, saline, aqueous dextrose and related sugar solutions and glycols such as propylene glycol or polyethylene glycols are the preferred liquid carriers for injectable solutions when the salts of the active ingredient are to be administered. When a parenteral dosage form of the free base, especially those compounds of this invention that do not readily form pharmaceutically acceptable salts, is desired, those oils hereinbefore enumerated are the most preferred pharmaceutical carriers.

The sterile parenteral dosage forms mentioned above will ordinarily contain from about 0.05% to 10%, and preferably about 0.1% to 1% by weight of the active ingredient.

In yet another embodiment of a pharmaceutical composition the active ingredient can be prepared for oral administration by incorporating it into a suitable liquid pharmaceutical carrier such as an aromatic water, elixir, syrup or a pharmaceutical mucilage.

Suitable pharmaceutical carriers are described in "Remington's Pharmaceutical Sciences" by E. W. Martin, a well-known reference text in this field.

In addition to the exemplary illustrations above, the following examples further explain one aspect of the present invention.

EXAMPLE 16

A large number of unit capsules are prepared for oral administration by filling each standard two-piece hard gelatin capsules with 25 milligrams of 1,3,3a,4,9,9a-hexahydro-2-methyl-4,9-ethano-2H-benz[f]isoindol - 10 - one hydrochloride, 8 milligrams of magnesium stearate, 40 milligrams of talc, and 327 milligrams of anhydrous lactose.

EXAMPLE 17

A large number of unit capsules are prepared for oral administration by filling each standard two-piece hard capsule with 10 milligrams 1,3,3a,4,9,9a-hexahydro - 2 - phenethyl-4,9-ethano-2H-benz[f]isoindol - 10 - one hydrochloride, 3.5 milligrams magnesium stearate and 161.5 milligrams lactose.

EXAMPLE 18

A large number of soft gelatin capsules are prepared for oral administration by filling each capsule with 2.5 milligrams 1,3,3a,4,9,9a-hexahydro - 2 - (3,3-dimethylallyl) - 4,9-ethano-2H-benz[f]isoindol - 10 - one, 125 milligrams of soybean oil, 4 milligrams of soy lecithin and 12 milligrams of a mixture of 1 part by weight of hydrogenated soybean oil, 1 part by weight of yellow beeswax and 4 parts by weight of partially hydrogenated mixed vegetable oils.

EXAMPLE 19

A large number of compressed tablets are prepared by conventional procedures so that the dosage unit is 25 milligrams of 1,3,3a,4,9,9a-hexahydro - 2 - methyl-6-hydroxy-4,9-ethano - 2H - benz[f]isoindol-10-one, maleate, 160 milligrams of anhydrous lactose, 20 milligrams of microcrystalline cellulose, 4 milligrams of magnesium stearate and 0.2 milligram of pyrogenic silica.

EXAMPLE 20

A large number of compressed tablets are prepared by conventional procedures so that the dosage unit is 50 milligrams 1,3,3a,4,9,9a-hexahydro - 6 - methoxy - 2 - methyl-4,9-ethano - 2H - benz[f]isoindol - 10 - one, 150 milligrams of lactose, 25 milligrams of cornstarch, 5 milligrams of magnesium stearate, 0.2 milligram of pyrogenic silica and 12 milligrams of gelatin.

EXAMPLE 21

A parenteral composition for administration by injection is prepared by conventional procedures so that each milliliter of composition contains 25 mg. 1,3,3a,4,9,9a-hexahydro - 2 - 4,9-ethano-2H-benz[f]isoindol-10-one, 0.125 ml. of 1 N HCl, 9 mg. sodium chloride, sufficient 1 N sodium citrate to adjust the pH to a range of from 5.8–6.2 and q.s. with distilled water to 1 ml.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

What is claimed is:

1. A compound of the formula

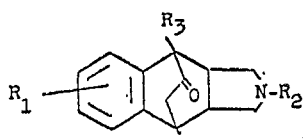

where $R_1$ is hydrogen, $NO_2$, $OR_4$, or

where $R_4$ is hydrogen, alkyl of one through three carbons or

where $R_5$ is hydrogen or alkyl of one through three carbons and $R_9$ is alkyl of one through six carbons;

$R_2$ is hydrogen, alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons benzyl or phenethyl; and the pharmaceutically acceptable salts of said compounds.

2. A compound of the formula

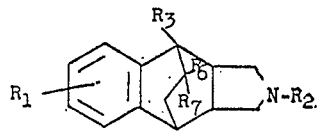

where $R_1$ is hydrogen, $NO_2$, $OR_4$, or

where $R_4$ is hydrogen, alkyl of one through three carbons or

where $R_5$ is hydrogen or alkyl of one through three carbons and $R_9$ is alkyl of one through six carbons;

$R_2$ is hydrogen, alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons, benzyl or phenethyl;

$R_6$ is hydrogen or $OR_8$ where $R_8$ is hydrogen or alkyl of one through three carbons;

$R_7$ is hydrogen or alkoxy of one through three carbons with the limitation that when $R_6$ is hydroxy, $R_7$ is hydrogen; or $R_7$ and $R_8$ taken together with the oxygens form cyclic alkyl ketal rings are alkylene of two or three carbons; and the pharmaceutically acceptable salts of said compound.

3. A compound of the formula

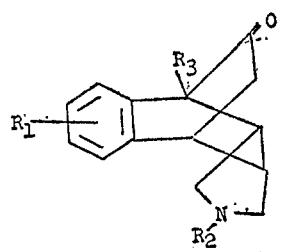

where $R_1$ is hydrogen, $NO_2$, $OR_4$, or

where $R_4$ is hydrogen, alkyl of one through three carbons or

where $R_5$ is hydrogen or alkyl of one through three carbons and $R_9$ is alkyl of one through six carbons;

$R_2$ is hydrogen, alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons benzyl or phenethyl; and the pharmaceutically acceptable salts of said compounds.

4. A compound of the formula

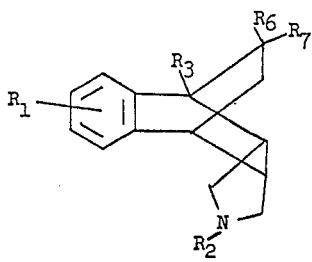

where $R_1$ is hydrogen, $NO_2$, $OR_4$, or

where $R_4$ is hydrogen, alkyl of one through three carbons or

where $R_5$ is hydrogen or alkyl of one through three carbons and $R_9$ is alkyl of one through six carbons;

$R_2$ is hydrogen, alkyl of one through five carbons, alkenyl of three through five carbons, said alkenyl having the double bond in other than the 1-position, propargyl, cyclopropylmethyl or phenethyl;

$R_3$ is hydrogen, alkyl of one through three carbons, benzyl or phenethyl;

$R_6$ is hydrogen or $OR_8$
where $R_8$ is hydrogen or alkyl of one through three carbons;

$R_7$ is hydrogen or alkoxy of one through three carbons with the limitation that when $R_6$ is hydroxy, $R_7$ is hydrogen; or $R_7$ and $R_8$ taken together with the oxygens form cyclic alkyl ketal rings are alkylene of two or three carbons; and the pharmaceutically acceptable salts of said compound.

5. A The compound of claim 1 which is 1,3,3a,4,9,9a-hexahydro - 2-methyl-4,9-ethano-2H-benz[f]isoindol-10-one.

6. The compound of claim 1 which is 1,3,3a,4,9,9a-hexahydro-2-(3,3-dimethylallyl)-4,9 - ethano-2H-benz[f]-isoindol-10-one.

7. The compound of claim 1 which is 1,3,3a,4,9,9a-hexahydro-2-phenethyl - 4,9-ethano-2H-benz[f]isoindol-10-one.

8. The compound of claim 1 which is 1,3,3a,4,9,9a-hexahydro - 2-methyl-6-hydroxy-4,9-ethano-2H-benz[f]-isoindol-10-one.

References Cited

UNITED STATES PATENTS 3,126,396 3/1964 Kitahonoki et al.
260—326.1(X)

ALEX MAZEL, Primary Examiner

J. A. NARCAVAGE, Assistant Examiner

U.S. Cl. X.R.

424—274